United States Patent [19]

Norris

[11] 4,007,863
[45] Feb. 15, 1977

[54] PICKUP TRUCK SPARE TIRE, JACK AND LUG WRENCH HOLDER

[76] Inventor: Oscar L. Norris, Rte. No. 1, Bennington, Okla. 74723

[22] Filed: Aug. 5, 1975

[21] Appl. No.: 603,374

[52] U.S. Cl. .................. 224/42.24; 224/42.25; 211/23; 70/259
[51] Int. Cl.² .................................. B62D 43/08
[58] Field of Search ........ 224/42.12, 42.13, 42.24, 224/42.25, 42.45 R, 42.42 R, 42.46 R, 29 R; 248/188.4, 354 S; 211/23, 24; 70/258, 259, 260

[56] References Cited

UNITED STATES PATENTS

| 3,613,972 | 10/1971 | Daughhetee | 224/42.24 |
| 3,843,033 | 10/1974 | Wirth | 224/42.24 |
| 3,865,291 | 2/1975 | Tidwell | 224/42.24 |

*Primary Examiner*—Robert J. Spar
*Assistant Examiner*—Jerold M. Forsberg
*Attorney, Agent, or Firm*—Clarence A. O'Brien; Harvey B. Jacobson

[57] ABSTRACT

An upright vertically extendable frame is provided including upper and lower portions. The lower portion includes widely spaced opposite end portions and the upper portion includes a central uppermost portion. The opposite end portions include depending feet adapted to rest upon spaced marginal portions of the flooring of a pickup truck load bed and the central uppermost portion includes an upwardly projecting abutment adapted to be engaged under the upper inwardly projecting ledge of the side wall of the associated pickup truck load bed. Finally, the vertical midportion of the frame includes clamp structure for clamping a vehicle wheel and tire assembly against one side of the frame.

10 Claims, 7 Drawing Figures

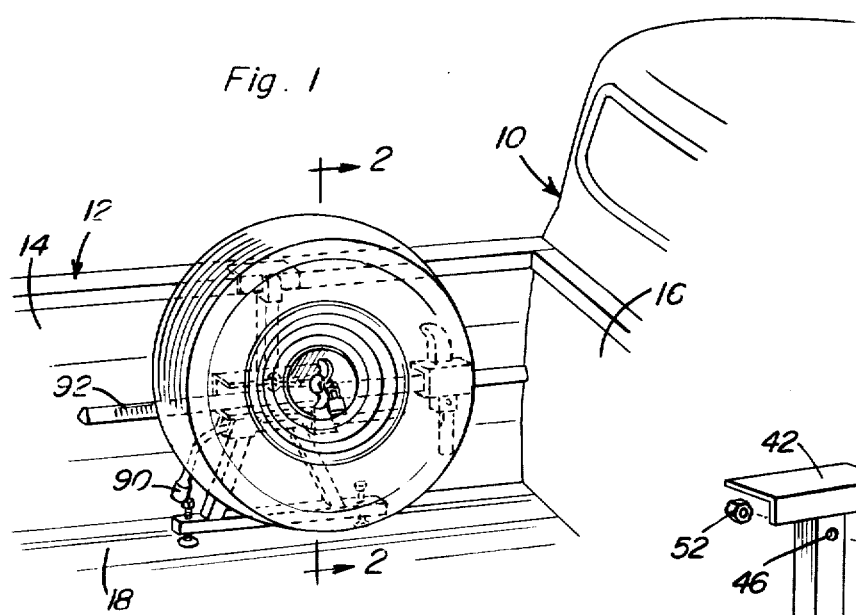
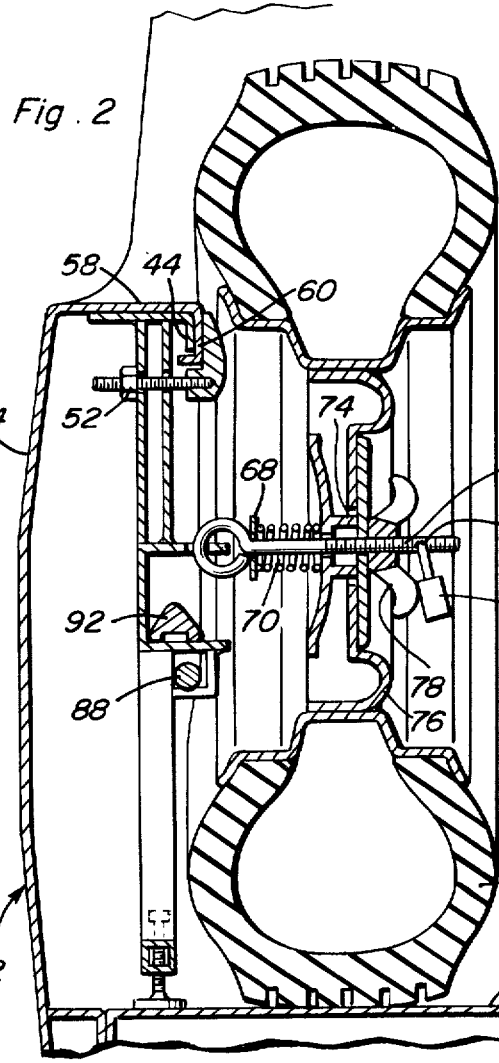
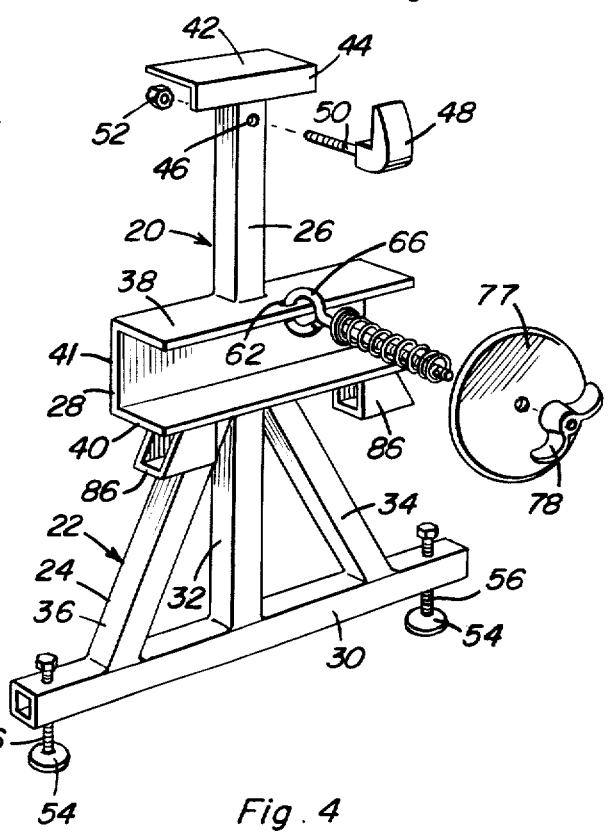
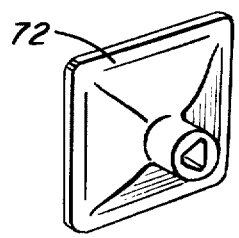

PICKUP TRUCK SPARE TIRE, JACK AND LUG WRENCH HOLDER

BACKGROUND OF THE INVENTION

It is common practice for spare tires and wheels of pickup trucks to be mounted centrally beneath the rear portion of the load bed of the pickup truck with the spare tire in a horizontally disposed position. While some pickup trucks are available with exterior horizontally outwardly opening spare tire and wheel receiving compartments, these are available only on pickup trucks having long wheel basis and constitute an extra cost option.

The more conventional manner of mounting a spare tire and wheel assembly in horizontal position beneath a rear portion of the load bed of a pickup truck includes several disadvantages. A spare tire mounted in this manner usually cannot be removed without the person removing the spare tire and wheel having to place one or more portions of his body on the ground. Further, an underslung mounted spare tire of this type is exposed to mud, snow and ice splash from the ground and a build-up of ice or mud on the release mechanism for such an underslung mounted spare tire and wheel can sometimes render the release mechanism difficult to operate. Still further, underslung mounted spare tires and wheels are difficult to lock in position independent of the provision of a length of chain and a padlock.

The aforementioned difficulties which are sometimes encountered with underslung mounted pickup truck spare tires and wheels are well known and thus various structures have been heretofore designed to provide a means whereby a spare tire and wheel may be securely mounted from an upstanding wall portion of the load bed of a pickup truck. Some forms of pickup truck load bed side wall mounted spare tire support structures are designed to support the associated spare wheel and tire on the exterior of the load bed and other forms are designed to support the associated spare tire and wheel on the interior of the associated load bed side wall. Examples of these two types of spare tire and wheel mounting structures are disclosed in U.S. Pat. Nos. 2,701,670, 2,772,826, 3,204,840 and 3,613,972. However, these previously known and patented forms of spare tire and wheel mounting structures have several disadvantages including the necessity to modify the pickup truck load bed structure in order to accept or mount the spare tire and wheel mounting structure thereon and not being sufficiently stable in order to securely fasten a relatively heavy pickup truck spare tire and wheel assembly in stored position.

BRIEF DESCRIPTION OF THE INVENTION

The spare tire and wheel mounting assembly of the instant invention includes an upright frame which is horizontally elongated and adpated to extend along the inside of one side wall of an associated pickup truck load bed. Opposite end lower portions of the frame include vertically adjustable feet and a central upper portion of the frame includes an upwardly projecting abutment adapted to engage under the conventional inwardly projecting upper ledge of a pickup truck load bed side wall, the undersurface portions of the feet being adapted to abut longitudinally spaced marginal portions of the flooring of the pickup truck load bed disposed beneath the associated upper side wall ledge portion with which the abutment carried by the upper portion of the frame is engaged. In this manner, an extremely stable support may be provided within the side wall of an associated pickup truck load bed.

The frame includes structure whereby the standard and base of a bumper jack as well as the handle portion of a lug wrench also may be securely supported in position behind the associated spare wheel the tire assembly.

The main object of this invention is to provide a spare tire mounting structure whereby the spare tire and wheel assembly of a pickup truck may be mounted inwardly of one side wall portion of the load bed of the pickup truck.

Another object of this invention is to provide a spare tire mount in accordance with the preceding object and including structure by which a bumper jack standard and base as well as a lug wrench handle may also be securely supported in stored position behind the associated spare tire and wheel assembly.

Another important object of this invention is to provide an apparatus in accordance with the preceding objects and including structure by which an associated spare tire an wheel may be locked in supported position.

Another important object of this invention is to provide a spare tire and wheel assembly mounting structure which may be readily mounted within the associated pickup truck, independent of any modifications to the associated pickup truck load bed.

Yet another object of this invention is to provide a spare tire and wheel mount assembly which will be readily adaptable for use in conjunction with pickup truck spare tire and wheel assemblies of various sizes.

A final object of this invention to be spcifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view of the forward left hand portion of the load bed of a pickup truck with a first form of pickup truck spare tire mounting structure disclosed therein and having a pickup truck spare tire and wheel assembly anchored thereto;

FIG. 2 is an enlarged fragmentary, transverse, vertical sectional view taken substantially upon the plane indicated by the section line 2—2 of FIG. 1;

FIG. 3 is a perspective view of the spare tire and wheel mounting structure;

FIG. 4 is a perspective view of a bumper jack base which may also be supported from the structure illustrated in FIG. 3;

DETAILED DESCRIPTION OF THE INVENTION

Figure 5:
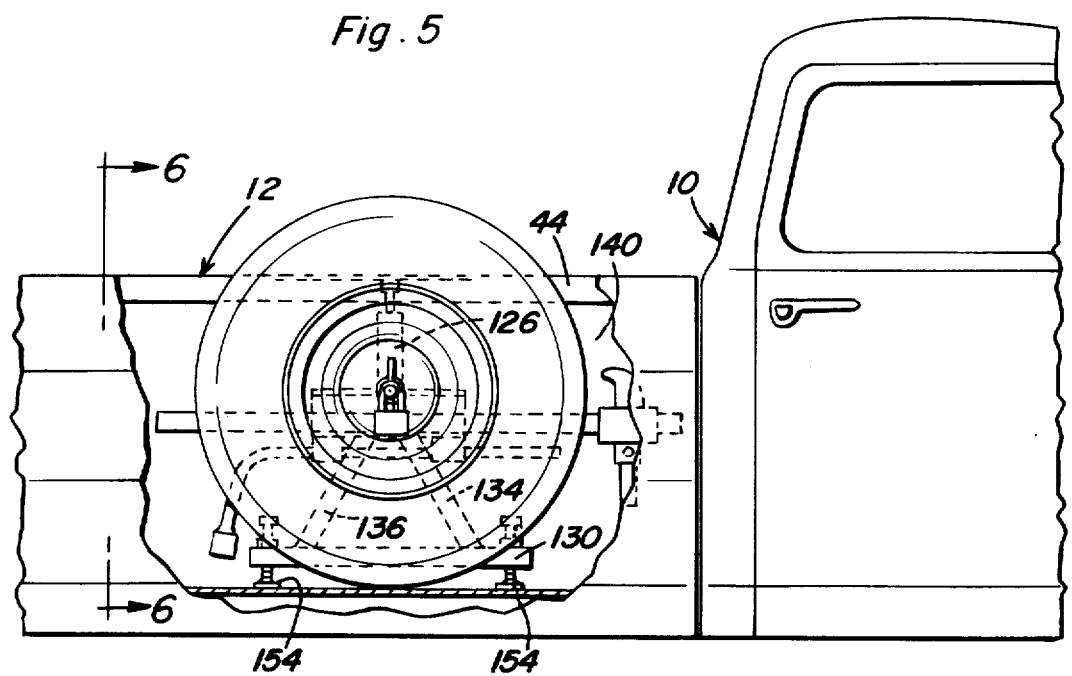
FIG. 5 is a fragmentary, side elevational view of a pickup truck having a second form of spare tire and wheel assembly mounting structure constructured in accordance with the present invention mounted therein.

Referring now more specifically to FIG. 1 of the drawings, the numeral 10 generally designates a conventional form of pickup truck including a load bed referred to in general by the reference numeral 12. The load bed 12 includes an upstanding longitudinal side wall 14 and a forward transverse wall 16 as well as a flooring 18.

From FIGS. 2 and 3 of the drawings, it may be seen that a first form of spare tire and wheel assembly mounting structure constructed in accordance with the present invention is referred to in general by the reference numeral 20. The structure 20 includes an upstanding frame referred to in general by the reference numeral 22 including a lower portion 24, an upper portion 26 and a horizontal mid-portion 28. The lower portion 24 includes a horizontal lengthwise extending longitudinal member 30, a central upright 32 having its lower end secured to the central portion of the longitudinal member 30. The upright 32 projects upwardly from the longitudinal member 30 and a pair of upwardly convergent inclined braces 34 and 36 have their lower end portions securely anchored to the opposite end portions of the longitudinal member 30 and their upper end portions secured to opposite side portions of the upper end of the upright 32.

The horizontal mid-portion 28 comprises a horizontally elongated and opening channel member including upper and lower flanges 38 and 40 interconnected by means of an upstanding bight portion 41. The upper ends of the upright 32 and the braces 34 and 36 are secured by welding to the central portion of the underside of the lower flange 40.

The upper portion 26 comprises an upright member 40 having its lower end suitably secured as by welding to the central portion of the upper surface of the upper flange 38 and the upper terminal end of the member 26 has a horizontal abutment flange 42 secured thereto. The abutment flange 42 includes a marginal edge which generally parallels the lower member 30 and the channel member 28 and terminates in a downturned abutment flange 44. The upper end portion of the member 26 is provided with a bore 46 therethrough and an inwardly and upwardly opening hook 48 including a threaded shank 50 has its shank 50 adjustably secured through the bore 46 by means of a threaded nut 52.

It will also be noted from FIG. 3 of the drawings that the opposite ends of the lower member 30 include foot members 54 carried by the lower ends of screw shafts 56 threadedly engaged with the opposite end portions of the lower member 30.

From FIG. 2 of the drawings it may be seen that the frame 22 is positioned along the side wall 14 immediately inwardly of the latter with the foot members 54 engaged with the flooring 18 and the upper surface of the abutment flange 42 engaged under the inturned ledge 58 carried by the upper marginal edge of the side wall 14, the ledge 58 terminating inwardly in a downturned flange 60. By adjusting the threaded shafts or screw members 56, the structure 20 may be vertically expanded between the flooring 18 and the ledge 58.

Thereafter, the nut 52 is tightened in order to clamp flange 60 between the hook member 48 and the abutment flange 44. In this manner, the structure 20 may be securely mounted within the associated load bed 12.

The central free edge of the upper flange 38 includes a vertical aperture 62 formed therethrough and a threaded shank member 64 having an integral eye portion 66 on one end thereof has its eye portion 66 engaged through the aperture 62. In addition, a small washer 68 is slidably mounted on the shank member 64, as is a compression spring 70. The centrally apertured jack base 72 of a conventional form of bumper jack may be slipped over the free end of the shank member after the spring 70 has been placed thereon and the shank member 64 may thereafter be passed through the central opening 74 in a spare tire wheel 76 and have an apertured disk 77 and a threaded wing nut 78 threadedly engaged therewith in order to clamp the wheel 76 in position with the lower periphery of the associated tire 80 engaged with the upper surface of the flooring 18, the shank member 64 being provided with a diametric bore 82 through which a padlock 84 may be engaged to lock the nut 78 on the shank member 64.

A pair of upwardly opening channel members 86 are secured to opposite end portions of the under side of the lower flange 40 of the channel member 28 and may receive the handle portion 88 of the conventional form of lug wrench 90 therethrough. Further, the upright standard portion 92 of the bumper jack having the base 72 as its base may be disposed within the channel member 28. It will be noted that diametrically opposite horizontal midportions of the tire 80 engage the opposite ends of the handle 88 of the lug wrench 90 as well as the opposite ends of the standard portion 92 of the bumper jack to thereby securely fasten the lug wrench 90 and standard portion 92 in position until such time as the wheel 76 is removed.

Figure 6:
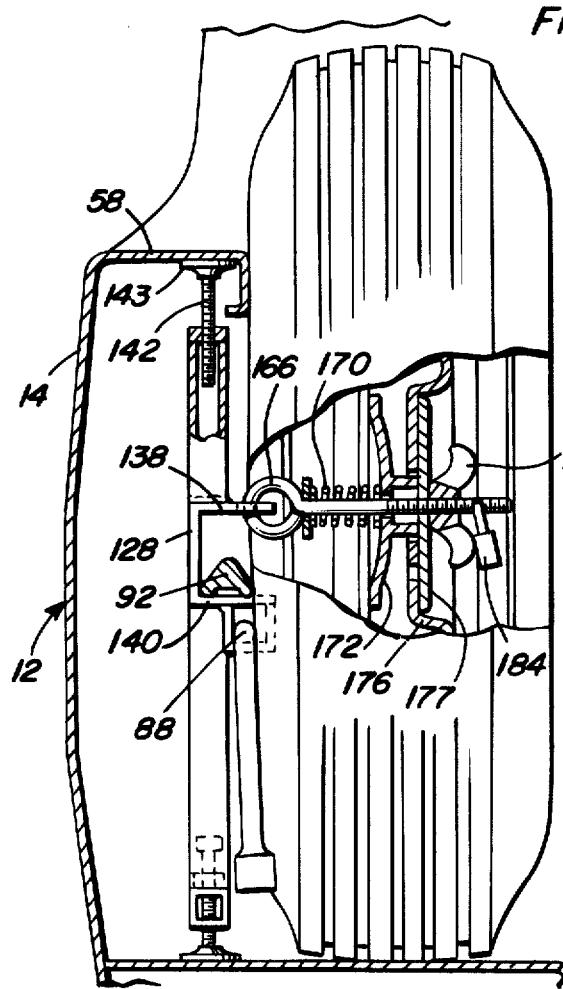
FIG. 6 is an enlarged fragmentary, transverse, vertical sectional view taken substantially upon the plane indicated by the section line 6—6 of FIG. 5.
Figure 7:
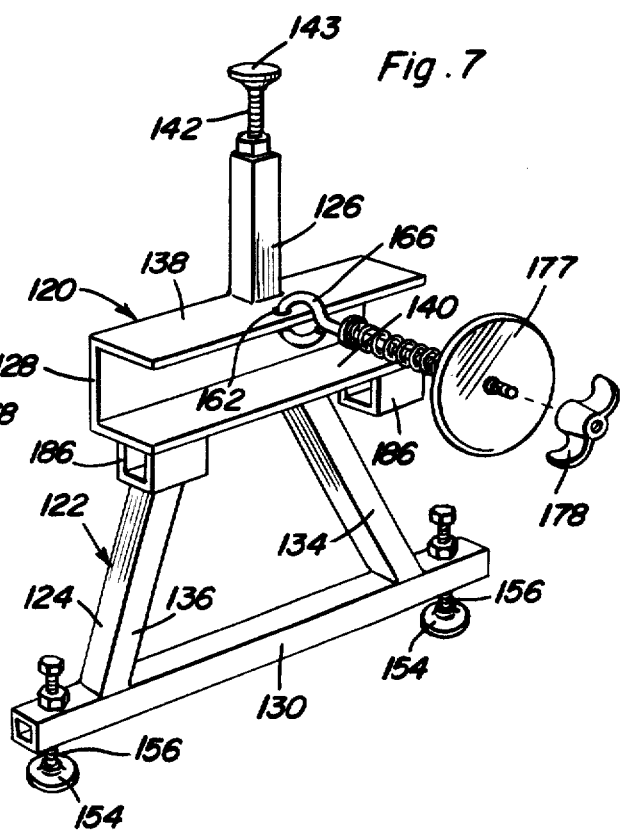
FIG. 7 is a perspective view of the spare tire and wheel mounting structure illustrated in FIGS. 5 and 6.

With attention invited now more specifically to FIGS. 5 through 7 of the drawings, there will be seen a second form of mounting structure referred to in general by the reference numeral 120 and which includes various components which are substantially identical to many of the components of the structure 20 and which are therefore designated by corresponding reference numerals in the 100 series.

The structure 120 differs from the structure 20 in that the upright member 126 thereof is vertically shorter than the upright member 26. Further, a screw member 142 is threadedly engaged with the upper end of the upright member 126 and is provided with an upper end abutment 143 for engagement with the under side of the inwardly directed ledge 58 of the side wall 14, see FIG. 6. Otherwise, the structure 120 is substantially identical in construction and operation to the structure 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A spare tire bracket assembly comprising an upright frame including upper and lower portions, said lower portion including widely spaced opposite end portions, said upper portion including a central uppermost portion, said opposite end portions including widely spaced depending foot portions adapted to rest upon spaced marginal portions of the flooring of a pickup truck load bed, said central uppermost portion including an upwardly projecting abutment adapted to be engaged under the upper inwardly projecting ledge of a side wall of said load bed extending along said marginal portions for anchoring said bracket in said load bed, a vertical mid-portion of said frame including lockable clamp means adapted to clamp a vehicle wheel and tire against one side of said frame and means defining a horizontal recess which opens outwardly of said one side of said frame for receiving an elongated jack member therein, said clamp means being operative to clamp said tire against the opposite ends of said jack member to hold the latter, as well as said tire, tightly in position relative to said bracket assembly.

2. The combination of claim 1 wherein said clamp means comprises a threaded stud member having one base end anchored to said vertical midportion and a free end portion upon which a threaded thrust and abutment member is threadedly mounted.

3. The combination of claim 2 wherein said base end of said stud member is anchored to said mid-portion for at least limited angular displacement in all directions relative thereto.

4. The combination of claim 3 including a centrally apertured disk slidably mounted on said stud member.

5. The combination of claim 1 wherein said clamp means comprises a threaded stud member having one base end anchored to said vertical mid-portion and a free end portion upon which a threaded thrust and abutment member is threadedly mounted, said base end of said stud member including means defining an abutment portion facing toward the free end of said stud member, a compression spring slidingly disposed on said stud member.

6. The combination of claim 1 wherein the upwardly projecting abutment includes a clamp member operatively associated with said abutment for clamping a down turned flange projecting downwardly from the inner marginal edge of said ledge between said abutment and said clamp member.

7. The combination of claim 1 wherein said clamp means comprises a threaded stud member having one base end anchored to said vertical midportion and a free end portion upon which a threaded thrust and abutment member is threadedly mounted, each of said depending foot portions and the corresponding end portion of said frame including means supporting the foot portion from said frame for vertical adjustment relative thereto.

8. The combination of claim 7 wherein said foot portions are threadedly supported from said opposite end portions.

9. The combination of claim 1 wherein said upwardly projecting abutment comprises a clamp screw threadedly supported from said central uppermost portion.

10. The combination of claim 1 wherein said uppermost central portion includes an upwardly and horizontally inwardly opening hook member projecting outwardly of said one side of said frame and shiftable inwardly toward the latter as well as an outwardly facing abutment surface opposing said hook member, said hook member being adapted to clamp the conventional downturned flange extending along the inner marginal edge of said ledge.

* * * * *